(12) United States Patent
Henriksen et al.

(10) Patent No.: US 10,983,730 B2
(45) Date of Patent: *Apr. 20, 2021

(54) ADAPTING RESILIENCY OF ENTERPRISE OBJECT STORAGE SYSTEMS

(71) Applicant: Synamedia Limited, Staines Upon Thames (GB)

(72) Inventors: Dana Marlow Henriksen, Lindin, UT (US); Mel J. Oyler, Pleasant Grove, UT (US)

(73) Assignee: Synamedia Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,366

(22) Filed: Aug. 28, 2019

(65) Prior Publication Data

US 2019/0384498 A1    Dec. 19, 2019

Related U.S. Application Data

(63) Continuation of application No. 15/264,405, filed on Sep. 13, 2016, now Pat. No. 10,437,522.

(51) Int. Cl.
| | | |
|---|---|---|
| *G06F 11/00* | (2006.01) | |
| *H03M 13/00* | (2006.01) | |
| *G06F 3/06* | (2006.01) | |
| *G06F 11/10* | (2006.01) | |

(52) U.S. Cl.
CPC .............. *G06F 3/067* (2013.01); *G06F 3/064* (2013.01); *G06F 3/0619* (2013.01); *G06F 3/0632* (2013.01); *G06F 3/0683* (2013.01); *G06F 11/1076* (2013.01)

(58) Field of Classification Search
CPC ........ G06F 3/067; G06F 3/0619; G06F 3/064; G06F 3/0683; G06F 3/0682; G06F 11/1076
See application file for complete search history.

(56) References Cited

U.S. PATENT DOCUMENTS

| | | | |
|---|---|---|---|
| 9,122,699 B2 | 9/2015 | Molaro et al. | |
| 9,141,679 B2 | 9/2015 | Gopalan et al. | |
| 9,176,818 B2 | 11/2015 | Mehra et al. | |
| 10,437,522 B2 * | 10/2019 | Henriksen ............. | G06F 3/0619 |
| 2014/0052706 A1 | 2/2014 | Misra et al. | |
| 2014/0279895 A1 | 9/2014 | Mehra et al. | |
| 2016/0041887 A1 | 2/2016 | Davis et al. | |

* cited by examiner

*Primary Examiner* — Samir W Rizk

(74) *Attorney, Agent, or Firm* — Fernando & Partners, LLP

(57) ABSTRACT

Various implementations disclosed herein enable managing a resiliency factor of an object stored in an enterprise object storage system. For example, in various implementations, a method of adjusting a realized resiliency factor of an object based on a target resiliency factor for the object is performed by an ingest entity of a storage system that includes a cluster of storage entities. The ingest entity includes a non-transitory computer readable storage medium, and one or more processors. In various implementations, the method includes obtaining a target resiliency factor for an object. In various implementations, the method includes determining whether or not to adjust a realized resiliency factor of the object based on the target resiliency factor. In various implementations, the method includes adjusting the realized resiliency factor of the object to an adjusted resiliency factor in response to determining to adjust the realized resiliency factor.

20 Claims, 5 Drawing Sheets

ADAPTING RESILIENCY OF ENTERPRISE OBJECT STORAGE SYSTEMS

CROSS-REFERENCE TO RELATED APPLICATION

This application is a continuation of U.S. patent application Ser. No. 15/264,405, filed on Sep. 13, 2016, the contents of which are hereby incorporated by reference for all purposes.

TECHNICAL FIELD

The present disclosure relates generally to enterprise object storage systems, and in particular, to managing data loss resiliency of enterprise object storage systems.

BACKGROUND

Some previously available storage systems provide fault tolerance through data mirroring. With data mirroring, multiple copies of an object are stored on a vault disk and again on different drives, so that a drive failure can only damage at most one copy of the data. The downside of data mirroring is that it is expensive due to being resource-intensive. For example, to be resilient to one failure, a storage system that utilizes data mirroring has to double the disk space available. Similarly, to be resilient to two failures, a storage system that utilizes data mirroring has to triple the disk space available. Another particular problem with data mirroring is that it results in a policy conflict for recording various media programs. Specifically, when recording a program on behalf of a customer, the Digital Millennium Copyright Act (DMCA) provides that one and only one unique instance of the data may be created for the customer. Therefore in this situation, data mirroring for the sake of providing fault tolerance violates copyright and associated fair use restrictions.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
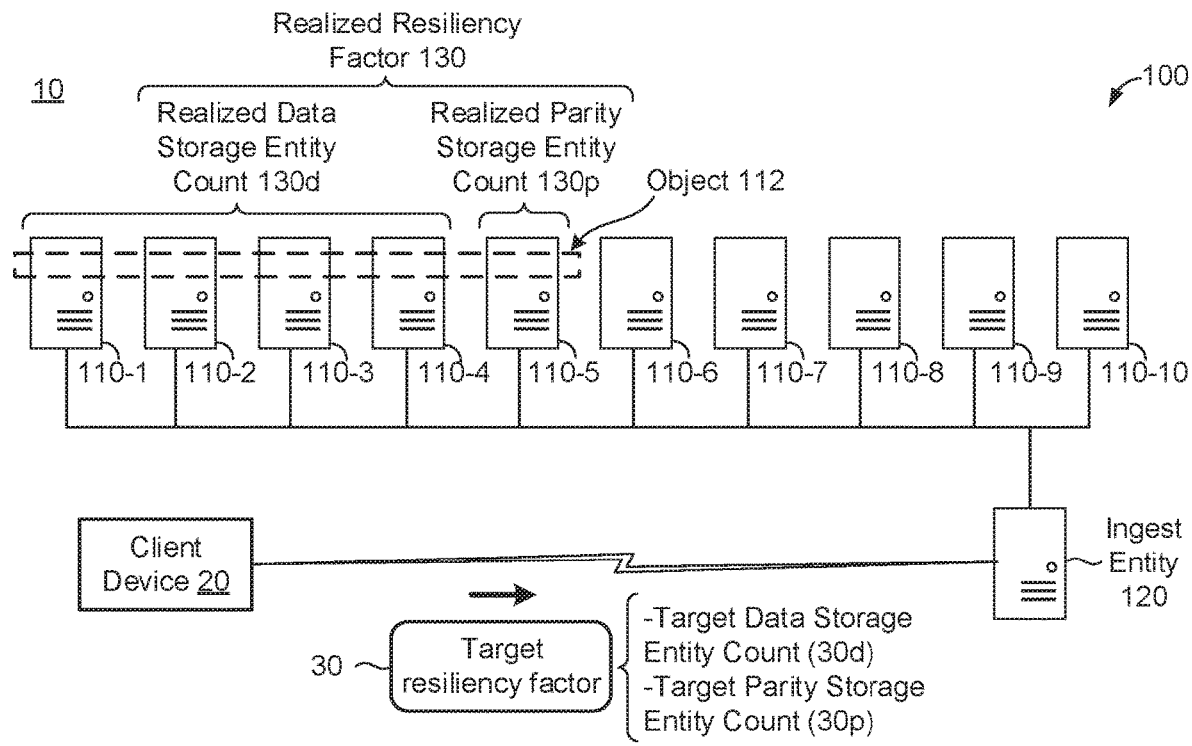
FIGS. 1A-1B are schematic diagrams of a storage system environment that includes a fault-tolerant enterprise object storage system in communication with a client device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

OVERVIEW

Some previously available storage systems provide fault tolerance through erasure coding. Typically, a storage system that utilizes erasure coding stores an object across various storage entities. In addition to storing object data, some previously available storage systems synthesize and store parity information for the object. Such storage systems are typically capable of detecting a loss of object data. Upon detecting the loss of object data, the storage system utilizes the parity information and the remaining object data to reconstruct the lost object data. Some previously available storage systems operate according to a predefined resiliency overhead that indicates a percentage of storage space that the storage system allocates to store parity information. Typically, a higher resiliency overhead makes the storage system more resilient to failures that result in data loss. However, a higher resiliency overhead tends to increase the cost of storing objects because maintaining a higher resiliency overhead is more resource-intensive.

Various implementations disclosed herein enable adjusting a realized resiliency factor associated with an object based on a target resiliency factor for the object. For example, in various implementations, a method of adjusting a realized resiliency factor of an object is performed by an ingest entity of a fault-tolerant enterprise object storage system ("storage system", hereinafter for the sake of brevity). In some implementations, the storage system is configured to synthesize parity data for an object in order to protect the object from a data loss event. In various implementations, the storage system includes a plurality of storage entities, and one or more computing processors. In some implementations, each storage entity is configured to store object data and/or parity data on a block basis. In various implementations, the method includes obtaining a target resiliency factor for an object or the storage system as a whole. In some implementations, the target resiliency factor indicates a target number of data storage entities for storing object data (e.g., a target data storage entity count) and a target number of parity storage entities for storing parity information (e.g., a target parity storage entity count).

In various implementations, the method includes determining whether or not to adjust a realized resiliency factor of the object based on the target resiliency factor. In some implementations, the realized resiliency factor indicates a first number of data storage entities configured to store object data (e.g., a realized data storage entity count) and a first number of parity storage entities configured to store parity information (e.g., a realized parity storage entity count). In various implementations, the method includes adjusting the realized resiliency factor to an adjusted resiliency factor. In some implementations, the adjusted resiliency factor includes at least one of a second number of data storage entities (e.g., an adjusted data storage entity count) and a second number of parity storage entities (e.g., an adjusted parity storage entity count) in order to provide fault-tolerance for the object data within a threshold range of the target resiliency factor.

EXAMPLE EMBODIMENTS

Figure 1B:
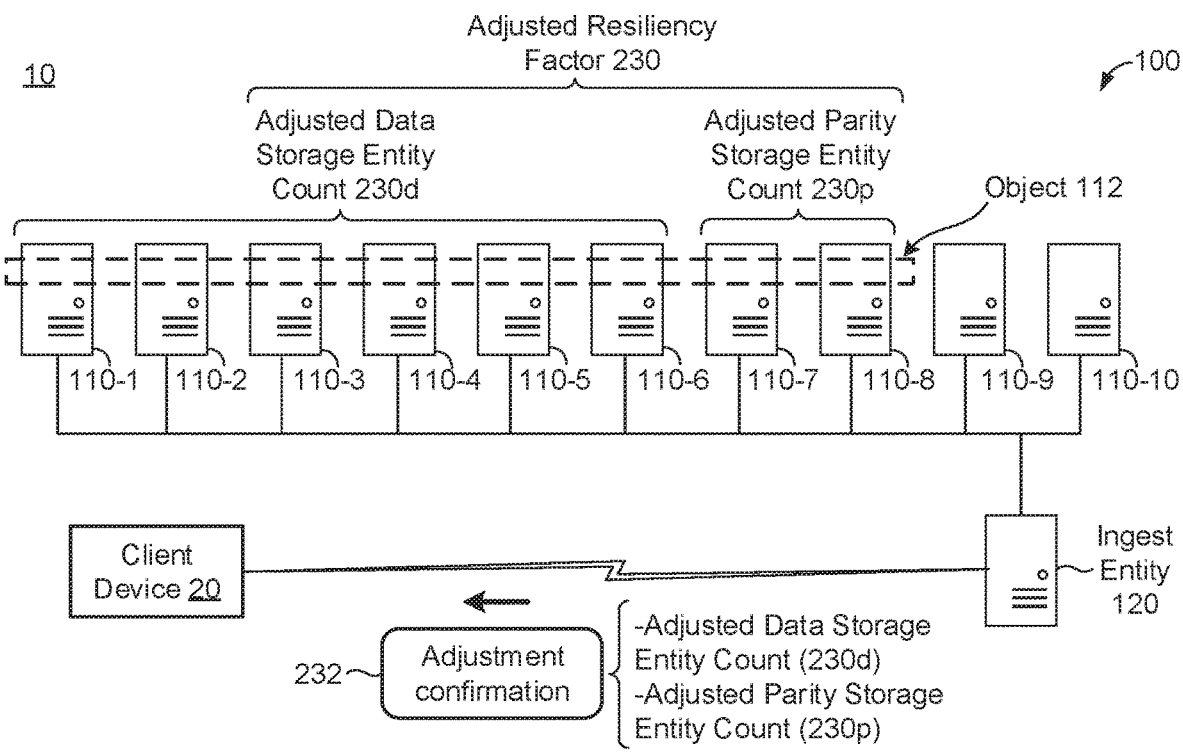

FIGS. 1A and 1B are schematic diagrams of a storage system environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the storage system environment 10 includes a client device 20, and a fault-tolerant enterprise object storage system 100 (storage system 100, hereinafter). In various implementations, the client device 20 and the storage system 100 communicate via a network (not shown), such as portions of the Internet and/or a private network.

In operation, the storage system 100 is utilized to store various objects. In some implementations, an object refers to a data asset. In some implementations, an object includes a data asset that is presentable to a user via the client device 20. For example, the object includes a video file that represents a movie or a TV show, an audio file that represents a song, a text file, etc. In various implementations, the object includes a file of any file type (e.g., .mov, .wma, .mp4, .avi, .mp3, .jpg, .txt, .doc, .docx, .xls, .ppt, etc.) In some implementations, an object includes a data asset that represents a set of computer-readable instructions that are executable at the client device 20. For example, in some implementations, the object includes a native application that is downloaded and installed at the client device 20, a browser plugin, etc.

In various implementations, the storage system 100 includes a cluster of storage entities 110-1, 110-2 . . . 110-10 (collectively, storage entities 110), and an ingest entity 120. In the example of FIGS. 1A-1B, the storage system 100 includes ten storage entities 110. However, in some examples, the storage system 100 includes a fewer number of storage entities 110, or a greater number of storage entities 110. The storage entities 110 store objects. For example, as illustrated in FIG. 1A, some of the storage entities 110 collectively store an object 112. In various implementations, some of the storage entities 110 are configured to store object data for the object 112, and some of the remaining storage entities 110 are configured to store parity data for the object 112. In some implementations, the storage entities 110 that store object data for the object 112 are referred to as data storage entities, and the storage entities 110 that store parity data for the object 112 are referred to as one or more parity storage entities. The storage system 100 utilizes any suitable combination of methods and systems for synthesizing the parity data. In various implementations, the storage system 100 utilizes the parity data to recover (e.g., rebuild, reconstruct, restore, and/or repair) the object 112 in the event of a data loss. In some implementations, the storage entities 110 and the ingest entity 120 are network entities such as servers.

In some implementations, a storage entity 110 includes one or more computer readable storage mediums. For example, the storage entity 110 includes solid state memory devices, hard disk memory devices, optical disk drives, read-only memory and/or nanotube-based storage devices. In some implementations, the storage entities 110 includes servers that execute computer-readable instructions. In various implementations, a storage entity 110 includes various blocks (not shown). For example, in some implementations, a storage entity 110 that stores object data (e.g., a data storage entity such as the storage entities 110-1, 110-2 . . . 110-4) includes data blocks for storing the object data. Similarly, a storage entity 110 that stores parity data (e.g., a parity storage entity such as the storage entity 110-5) includes parity blocks for storing the parity data. As described herein, in various implementations, a block refers to the smallest addressable block of memory (e.g., the smallest allocation unit of data) in a storage entity 110. In some implementations, the blocks are identically-sized (e.g., 2 MB each) for processing convenience.

Figure 5:
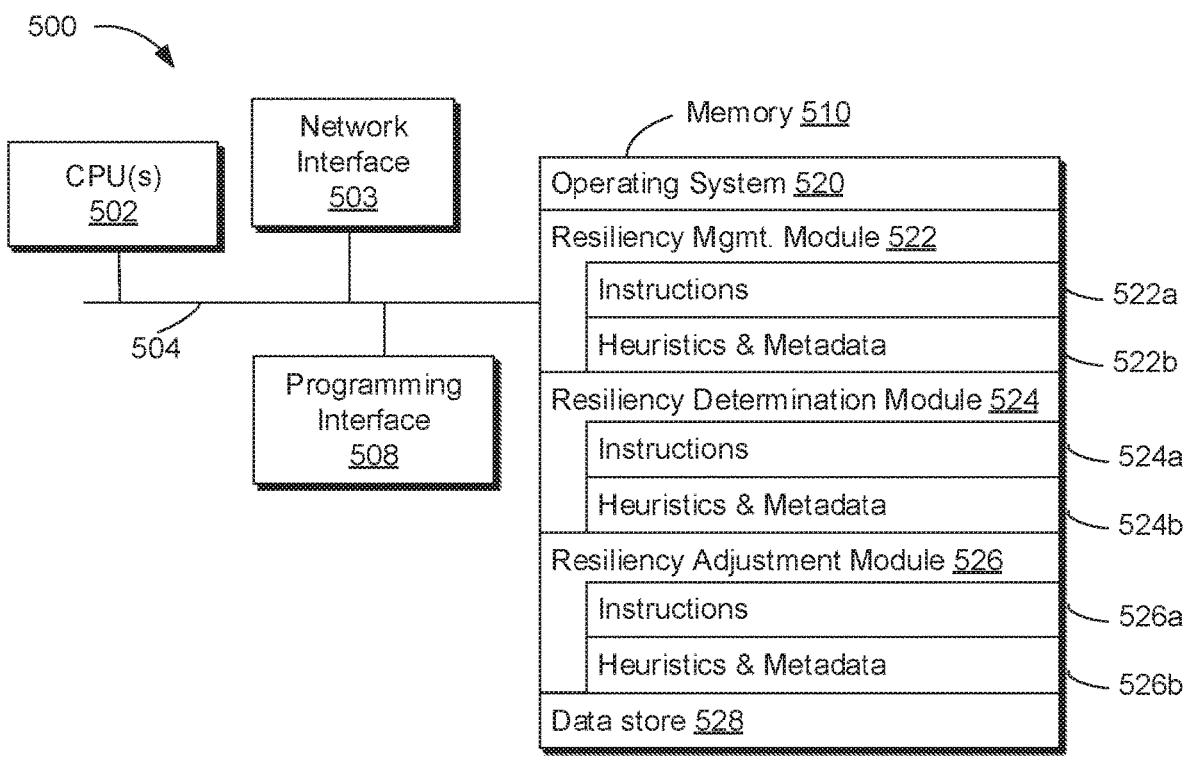
FIG. 5 is a block diagram of a server system enabled with various modules that are provided to adjust a realized resiliency factor of an object based on a target resiliency factor for the object in accordance with some implementations.

In various implementations, the ingest entity 120 serves as an interface for the storage system 100. The ingest entity 120 receives/transmits data from/to any device that is external to the storage system 100. Specifically, the ingest entity 120 receives/transmits data from/to the client device 20. In various implementations, receiving/transmitting data includes receiving/transmitting the objects. Alternatively and/or additionally, receiving/transmitting data includes receiving/transmitting instructions. In some implementations, the instructions include operations that are performed in relation to the objects. Example instructions include writing an object, reading an object, deleting an object, copying an object, etc. In some implementations, the ingest entity 120 includes hardware and/or software that enables the ingest entity 120 to perform various operations described herein. In some examples, the ingest entity 120 is implemented by a server system (e.g., as illustrated in FIG. 5). In some implementations, the ingest entity 120 is configured to operate as one of the storage entities 110. Put another way, in some implementations, one of the storage entities 110 is configured to operate as the ingest entity 120.

In various implementations, the storage system 100 utilizes various methods and systems associated with distributed erasure coding. In some implementations, the storage system 100 distributes an object across multiple storage entities 110. For example, the storage system 100 stores the first 2 MB of the object data at storage entity 110-1, the next 2 MB of the object data at storage entity 110-2, etc. In some implementations, the storage system 100 distributes the object across multiple storage entities 110 even if the object is small enough to be stored at a single storage entity 110. Distributing the object data and the parity data across multiple storage entities 110 reduces the risk of losing the entire object in the event of a data loss. To that end, in various implementations, the object 112 is a data asset (e.g., a data item) that is stored in accordance with distributed erasure coding.

In various implementations, the object 112 is associated with a realized resiliency factor 130. In various implementations, the realized resiliency factor 130 indicates a number of storage entities 110 that the storage system 100 has allocated to store the object data, and a number of storage entities 110 that the storage system 100 has allocated to store the parity data for the object 112. In some implementations, the number of storage entities 110 that store the object data is referred to as a realized data storage entity count 130$d$, and the number of storage entities 110 that store parity data is referred to as a realized parity storage entity count 130$p$. In the example of FIG. 1A, the object 112 is stored across five storage entities (e.g., storage entities 110-1, 110-2 . . . 110-5). In this example, four of the five storage entities 110 store object data, and one of the five storage entities 110 stores parity data. For example, as illustrated, the storage entities 110-1, 110-2 . . . 110-4 store object data and the storage entity 110-5 stores parity data. Thus, in the example of FIG. 1A, the realized data storage entity count 130$d$ for the object 112 is four, and the realized parity storage entity count 130$p$ is one. In some scenarios, the realized resiliency factor 130 is expressed as a ratio of the realized data storage entity count 130$d$ and the realized parity storage entity count 130$p$ (e.g., 4:1 for the object 112 shown in FIG. 1A).

In various implementations, the realized resiliency factor 130 differs for various objects that are stored in the storage system 100. In other words, in various implementations, the storage system 100 stores objects according to different realized resiliency factors 130. In various implementations, the realized resiliency factor 130 indicates a realized resiliency overhead associated with the object 112. In various implementations, the realized resiliency overhead is determined (e.g., computed) by dividing the realized parity storage entity count 130$p$ for the object by the realized data storage entity count 130$d$ for the object. In some implementations, the realized resiliency overhead is expressed as a percentage that represents the percentage of storage entities 110 allocated for storing parity data for the object 112. In the example of FIG. 1A, the realized resiliency overhead for the object 112 is 0.25 (¼) or 25%.

In various implementations, the storage system 100 (e.g., the ingest entity 120) obtains a target resiliency factor 30 for the object 112. For example, as illustrated in FIG. 1A, in some implementations, the storage system 100 receives the target resiliency factor 30 from the client device 20. In some implementations, the target resiliency factor 30 indicates a target data storage entity count 30$d$ (e.g., a target number of data storage entities for storing the object data), and a target parity storage entity count 30$p$ (e.g., a target number of parity storage entities for storing the parity data). In some examples, the storage system 100 receives the target resiliency factor 30 for the object 112 as part of a write request to write the object 112 into the storage system 100. Additionally and/or alternatively, in some examples, the storage system 100 receives the target resiliency factor 30 for the object 112 after the object 112 is written into the storage system 100. Moreover, in some examples, the storage system 100 obtains the target resiliency factor 30 by retrieving the target resiliency factor 30 from a non-transitory memory.

In some implementations, the target resiliency factor 30 indicates a target number of data storage allocations, and/or a target number of parity storage allocations. In some examples, the target number of data storage allocations refers to a target number of storage disks to store the object data, and the target number of parity storage allocations refers to a target number of storage disks to store the parity data. In some examples, the target number of data storage allocations refers to a target number of data blocks to store the object data, and the target number of parity storage allocations refers to a target number of parity blocks to store the parity data.

As illustrated in FIG. 1B, in various implementations, the storage system 100 adjusts the realized resiliency factor 130 to an adjusted resiliency factor 230 based on the target resiliency factor 30. In some implementations, the adjusted resiliency factor 230 includes an adjusted data storage entity count 230$d$ (e.g., an adjusted number of data storage entities for storing the object data), and/or an adjusted parity storage entity count 230$p$ (e.g., an adjusted number of parity storage entities for storing the parity data). In the example of FIG. 1B, the adjusted resiliency factor 230 is 6:2. Put another way, in the example of FIG. 1B, the adjusted data storage entity count 230$d$ is six, and the adjusted parity storage entity count 230$p$ is two. Moreover, in the example of FIG. 1B, the adjusted resiliency overhead is 0.33 (2/6) or 33%. A person of ordinary skill in the art will appreciate that since the adjusted parity storage entity count 230$p$ is greater than the realized parity storage entity count 130$p$ (between the two examples), the object 112 has become more resilient to data loss events. In various implementations, the storage system 100 adjusts the realized resiliency factor 130 to the adjusted resiliency factor 230 in order to provide fault-tolerance for the object 112 within a threshold range of the target resiliency factor 30. For example, in some implementations, the storage system 100 sets the adjusted resiliency factor 230 equal to the target resiliency factor 30. In some implementations, the storage system 100 adjusts the realized resiliency factor 130 to the adjusted resiliency factor 230 in order to attain a resiliency overhead that is closer to a target resiliency overhead indicated by the target resiliency factor 30.

In some implementations, the storage system 100 transmits an adjustment confirmation 232 to the client device 20 upon adjusting the realized resiliency factor 130 to the adjusted resiliency factor 230. In some examples, the adjustment confirmation 232 indicates the adjusted resiliency factor 230. For example, as illustrated in FIG. 1B, the adjustment confirmation 232 includes the adjusted data storage entity count 230$d$ and the adjusted parity storage entity count 230$p$. In some implementations, the adjustment confirmation 232 includes other information. For example, in some scenarios, the adjustment confirmation 232 includes the adjusted resiliency overhead for the object 112.

In some implementations, the storage entities 110 are implemented on the same computing device. For example, in some implementations, the storage entities 110 are storage disks. In such implementations, multiple storage entities 110 are enclosed in a single housing. Alternatively, in some implementations, the storage entities 110 are implemented on different computing devices. In some implementations, the storage system 100 is a distributed storage system including multiple computing devices networked over multiple locations. In some implementations, the storage system 100 is configured to store video data associated with multicast (e.g., broadcast) content. In other words, the storage system 100 serves as a digital video recorder (DVR). In some implementations, the storage system 100 serves as a cloud-based DVR, since the storage system 100 is capable of servicing read requests and write requests that the storage system 100 receives.

In various implementations, the client device 20 includes any suitable computing device, such as a computer, a laptop computer, a tablet device, a netbook, an internet kiosk, a personal digital assistant, a mobile phone, a smartphone, a wearable, a gaming device, a computer server, etc. In some implementations, the client device 20 includes one or more processors, one or more types of memory, a display and/or other user interface components such as a keyboard, a touch screen display, a mouse, a track-pad, a digital camera and/or any number of supplemental devices to add functionality. In some implementations, a client device 20 includes a suitable combination of hardware, software and firmware configured to provide at least some of protocol processing, modulation, demodulation, data buffering, power control, routing, switching, clock recovery, amplification, decoding, and error control.

Figure 2:
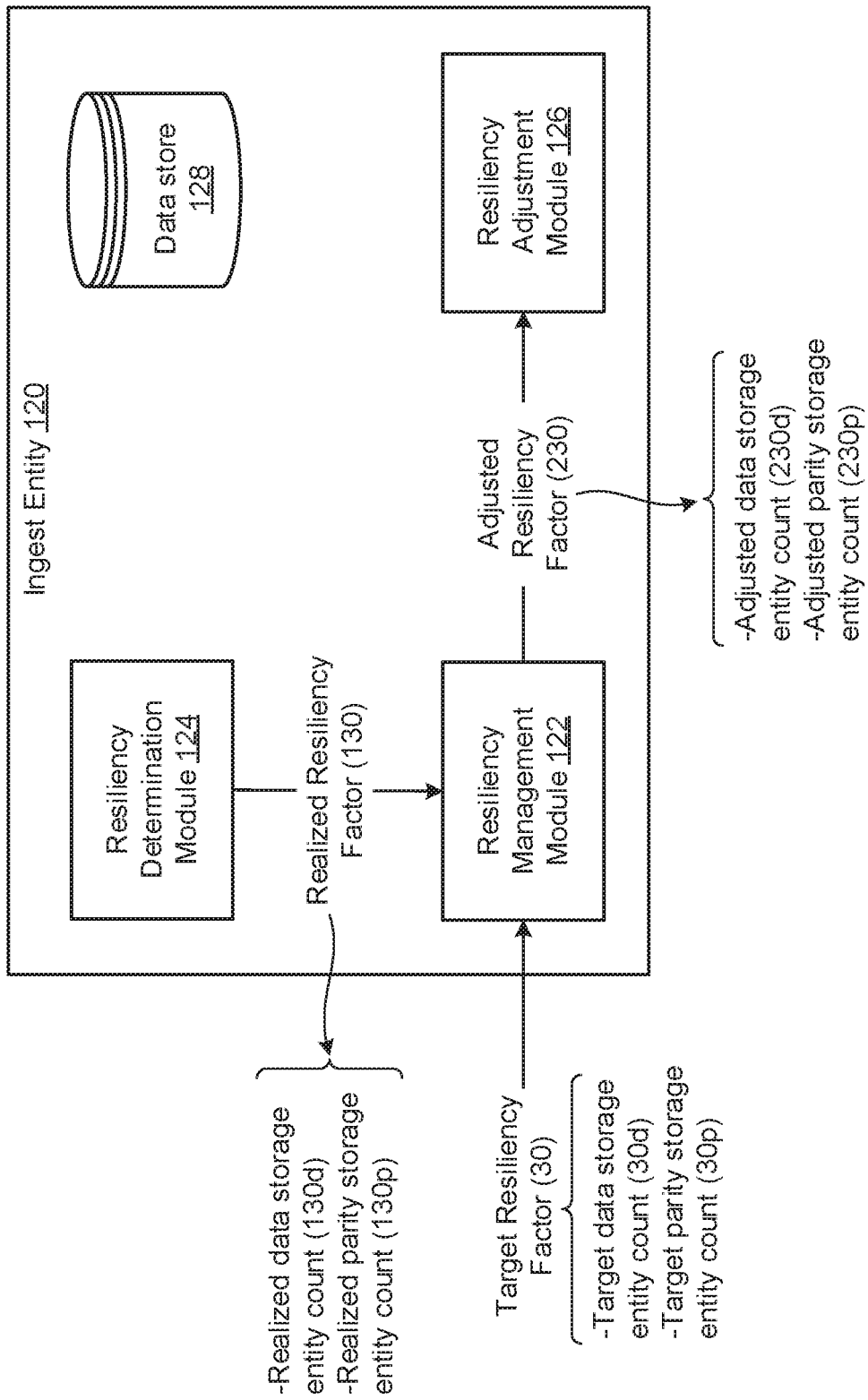
FIG. 2 is a block diagram of an ingest entity of the fault-tolerant enterprise object storage system in accordance with some implementations.

FIG. 2 is a block diagram of the ingest entity 120 in accordance with some implementations. In various implementations, the ingest entity 120 includes a resiliency management module 122, a resiliency determination module 124, a resiliency adjustment module 126, and a data store 128. In various implementations, the resiliency management module 122, the resiliency determination module 124, and the resiliency adjustment module 126 are implemented in hardware (e.g., as one or more application specific integrated circuits (ASICs)) and/or in software (e.g., as one or more sets of computer readable instructions that are executed by one or more central processing units).

In various implementations, the resiliency determination module 124 determines the realized resiliency factor 130 for the object 112. For example, in some implementations, the resiliency determination module 124 determines the realized data storage entity count 130$d$, and the realized parity storage entity count 130$p$ for the object 112. In some implementations, the resiliency determination module 124 queries the storage entities 110 to determine where various data segments (e.g., one or more data blocks) and parity segments (e.g., one or more parity blocks) of the object 112 are stored. In some examples, the resiliency determination module 124 transmits locate requests to the storage entities 110, and receives locate responses that indicate the locations of various data segments and parity segments. In some scenarios, the locate requests include an object identifier (ID) for the object 112. In various implementations, the resiliency determination module 124 determines the realized data storage entity count 130$d$ by counting the number of storage entities 110 that store data segments of the object 112. Similarly, the resiliency determination module 124 determines the realized parity storage entity count 130$p$ by counting the number of storage entities 110 that store parity segments of the object 112. In some implementations, the resiliency determination module 124 provides the realized resiliency factor 130 to the resiliency management module 122. Additionally and/or alternatively, the resiliency determination module 124 stores the realized resiliency factor 130 in the data store 128. In various implementations, the resiliency determination module 124 determines the realized resiliency factor 130 periodically, and/or in response to a request (e.g., from the resiliency management module 122).

In various implementations, the resiliency management module 122 manages a resiliency factor of the object 112. In various implementations, the resiliency management module 122 obtains the target resiliency factor 30 for the object 112, and determines whether or not to adjust the realized resiliency factor 130 of the object 112 based on the target resiliency factor 30. In some implementations, the resiliency management module 122 determines a number of available storage entities 110 in the storage system 100. Upon determining the number of available storage entities 110, the resiliency management module 122 determines whether the number of available storage entities 110 is sufficient to realize the target resiliency factor 30. For example, the resiliency management module 122 determines whether the number of available storage entities 110 is greater than or equal to a sum of the target data storage entity count 30$d$ and the target parity storage entity count 30$p$. If the number of available storage entities 110 is sufficient to realize the target resiliency factor 30, then the resiliency management module 122 determines to adjust the realized resiliency factor 130 to an adjusted resiliency factor 230. Moreover, if the number of available storage entities 110 is sufficient to realize the target resiliency factor 30, then the resiliency management module 122 sets the adjusted resiliency factor 230 equal to the target resiliency factor 30.

In some implementations, the resiliency management module 122 determines that the number of available storage entities 110 is not sufficient to realize the target resiliency factor 30. For example, the resiliency management module 122 determines that the number of available storage entities 110 is less than the sum of the target data storage entity count 30$d$ and the target parity storage entity count 30$p$. In such implementations, the resiliency management module 122 determines whether the number of available storage entities 110 is sufficient to adjust the realized resiliency factor 130 to an adjusted resiliency factor 230 that is closer to the target resiliency factor 30. If the number of available storage entities 110 is sufficient to adjust the realized resiliency factor 130 closer to the target resiliency factor 30, then the resiliency management module 122 determines an adjusted resiliency factor 230 that is closer to the target resiliency factor 30. In some implementations, the resiliency management module 122 determines that the number of available storage entities 110 is not sufficient to adjust the realized resiliency factor 130 equal to or closer to the target resiliency factor 30. In such implementations, the resiliency management module 122 determines not to adjust the realized resiliency factor 130. In various implementations, the resiliency management module 122 transmits the adjusted resiliency factor 230 to the resiliency adjustment module 126. In various implementations, the resiliency management module 122 selects an adjusted resiliency factor 230 that is within a threshold range of the target resiliency factor 30. In other words, in various implementations, the resiliency management module 122 determines to adjust the realized resiliency factor 130 in order to provide fault-tolerance for the object 112 within a threshold range of the target resiliency factor 30.

In various implementations, the resiliency adjustment module 126 adjusts the realized resiliency factor 130 to the adjusted resiliency factor 230. In some implementations, the resiliency adjustment module 126 re-distributes the object data for the object 112 across a number of storage entities 110 indicated by the adjusted data storage entity count 230$d$. In some implementations, the resiliency adjustment module 126 synthesizes parity information for the object 112 based on the re-distributed object data and the adjusted resiliency factor 230. Upon synthesizing the parity information, the resiliency adjustment module 126 stores the parity information across a number of storage entities 110 indicated by the adjusted parity storage entity count 230$p$. In some implementations, the resiliency adjustment module 126 transmits the adjustment confirmation 232 to the client device 20. In some examples, the adjustment confirmation 232 indicates the adjusted resiliency factor 230 for the object 112. In some implementations, the resiliency adjustment module 126 determines whether adjusting the realized resiliency factor 130 to the adjusted resiliency factor 230 would result in the object being mirrored. In such implementations, the resiliency adjustment module 126 adjusts the realized resiliency factor 130 to the adjusted resiliency factor 230 upon determining that the adjustment would not result in the object 112 being mirrored. However, if adjusting the realized resiliency factor 130 to the adjusted resiliency factor 230 would result in the object 112 being mirrored, then the resiliency adjustment module 126 determines not to adjust the realized resiliency factor 130 in order to avoid violation of copyright law. In various implementations, the resiliency adjustment module 126 adjusts the realized resiliency factor 130 to the adjusted resiliency factor 230.

In various implementations, the data store 128 stores information (e.g., metadata) associated with objects that are stored in the storage system 100. For example, in some implementations, the data store 128 stores object identifiers (IDs) for objects that are stored in the storage entities 110. In some implementations, the data store 128 stores the target resiliency factor 30 for the object 112. In such implementations, the resiliency management module 122 obtains the target resiliency factor 30 by retrieving the target resiliency factor 30 from the data store 128. In some implementations, the data store 128 stores the realized resiliency factor 130 for the object 112. In such implementations, the resiliency determination module 124 and/or the resiliency management module 122 retrieve the realized resiliency factor 130 from the data store 128. In some implementations, the resiliency management module 122 periodically obtains the target resiliency factor 30 from the data store 128 and determines whether or not to adjust the realized resiliency factor 130 based on the target resiliency factor 30. To that end, the data store 128 includes one or more databases, tables (e.g., look-up tables), indices (e.g., inverted indices), and/or any other suitable data structure.

Figure 3:
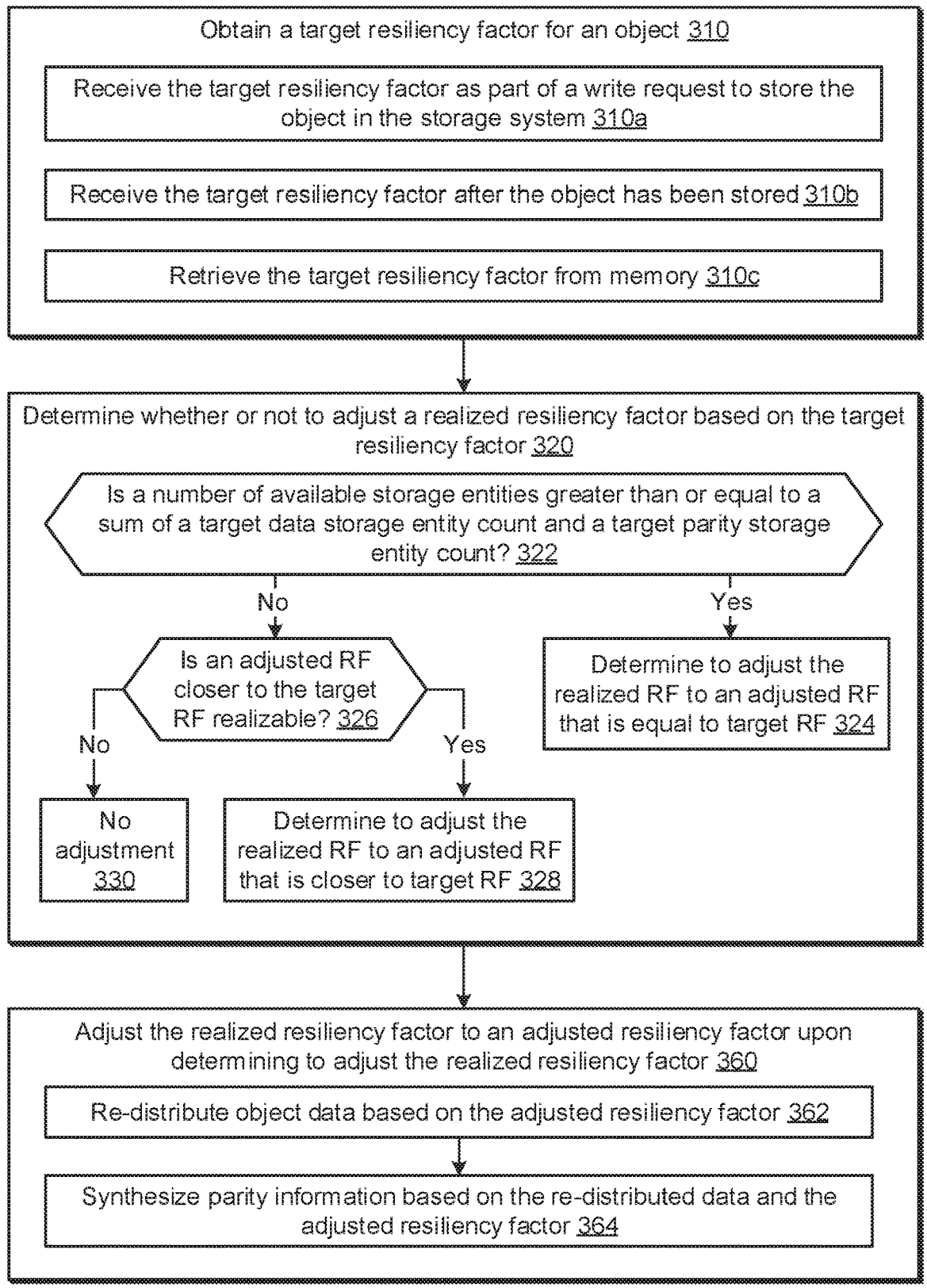
FIG. 3 is a flowchart representation of a method of adjusting a realized resiliency factor of an object based on a target resiliency factor for the object in accordance with some implementations.

FIG. 3 is a flowchart representation of a method 300 of adjusting a realized resiliency factor of an object based on a target resiliency factor for the object in accordance with some implementations. In various implementations, the method 300 is implemented as a set of computer readable instructions that are executed at a storage system (e.g., the storage system 100 shown in FIGS. 1A-1B). For example, in various implementations, the method 300 is performed by an ingest entity of the storage system (e.g., the ingest entity 120 shown in FIGS. 1A, 1B and 2). Briefly, the method 300 includes obtaining a target resiliency factor for an object, determining whether or not to adjust a realized resiliency factor of the object based on the target resiliency factor, and adjusting the realized resiliency factor to an adjusted resiliency factor upon determining to adjust the realized resiliency factor.

As represented by block 310, in various implementations, the method 300 includes obtaining a target resiliency factor for an object (e.g., the target resiliency factor 30 shown in FIGS. 1A and 2). As represented by block 310*a*, in some implementations, the method 300 includes receiving the target resiliency factor as part of a write request to write the object into the storage system. As represented by block 310*b*, in some implementations, the method 300 includes receiving the target resiliency factor after the object is stored in the storage system. In some examples, the object is stored according to a first target resiliency factor, and the method 300 includes receiving a second target resiliency factor that is different from the first target resiliency factor. As represented by block 310*c*, in some implementations, the method 300 includes retrieving the target resiliency factor from a non-transitory memory (e.g., the data store 128 shown in FIG. 2). In some examples, an object is stored according to a resiliency factor that is different from the target resiliency factor for the object (e.g., due to a lack of available storage entities). In such examples, obtaining the target resiliency factor includes periodically retrieving the target resiliency factor from the memory in order to determine whether the target resiliency factor is realizable (e.g., due to a change in the number of available storage entities). In various implementations, obtaining the target resiliency factor includes obtaining a target data storage entity count, and a target parity storage entity count (e.g., the target data storage entity count 30*d*, and the target parity storage entity count 30*p*, respectively, shown in FIGS. 1A and 2).

As represented by block 320, in various implementations, the method 300 includes determining whether or not to adjust a realized resiliency factor of the object based on the target resiliency factor for the object. As represented by block 322, in some implementations, the method 300 includes determining whether a number of available storage entities is greater than or equal to a sum of the target data storage entity count and the target parity storage entity count. In other words, in some implementations, the method 300 includes determining whether the number of available storage entities is sufficient to realize the target resiliency factor. In some examples, determining the number of available storage entities includes identifying the storage entities that are online (e.g., in service, and ready to store object data and/or parity data). In some implementations, if the number of available storage entities is greater than or equal to the sum then the method 300 proceeds to block 324, otherwise the method 300 proceeds to block 326. Put another way, if the number of available storage entities is sufficient to realize the target resiliency factor then the method 300 proceeds to block 324, else the method 300 proceeds to block 326. As represented by block 324, in various implementations, the method 300 includes determining to adjust the realized resiliency factor to an adjusted resiliency factor that is equal to the target resiliency factor.

As represented by block 326, in some implementations, the method 300 includes determining whether the number of available storage entities is sufficient to adjust the realized resiliency factor to an adjusted resiliency factor that is closer to the target resiliency factor. In some examples, the method 300 includes determining whether the number of available storage entities is sufficient to realize a resiliency factor that is within a threshold range of the target resiliency factor (e.g., within 10% of the target resiliency factor). In other words, in some implementations, the method 300 includes determining whether there are enough storage entities available to adjust the realized resiliency factor to an adjusted resiliency factor that is within a threshold range of the target resiliency factor. In various implementations, if an adjusted resiliency factor that is closer to the target resiliency factor is attainable, then the method 300 proceeds to block 328, otherwise the method 300 proceeds to block 330.

As represented by block 328, in various implementations, the method 300 includes determining to adjust the realized resiliency factor to an adjusted resiliency factor that is closer to the target resiliency factor (e.g., within a threshold range of the target resiliency factor). In various implementations, the adjusted resiliency factor being within a threshold range of the target resiliency factor refers to an adjusted resiliency overhead being within a threshold range of a target resiliency overhead. In various implementations, upon determining to adjust the realized resiliency factor, the method 300 includes determining the adjusted resiliency factor. In some implementations, determining the adjusted resiliency factor includes selecting a resiliency factor that is as close as possible to the target resiliency factor given the number of available storage entities. In various implementations, the adjusted resiliency factor is a function of the target resiliency factor and the number of available storage entities. In some implementations, the adjusted resiliency factor includes an adjusted data storage entity count that is different from (e.g., greater than, or less than) the realized data storage entity count. Additionally and/or alternatively, in some implementations, the adjusted resiliency factor includes an adjusted parity storage entity count that is different from (e.g., greater than, or less than) the realized parity storage entity count.

As represented by block 330, in various implementations, the method 300 includes determining not to adjust the realized resiliency factor. In some implementations, the method 300 includes determining not to adjust the realized resiliency factor if the number of the available storage entities is not sufficient to realize an adjusted resiliency factor that is closer to the target resiliency factor. In some implementations, the method 300 includes determining not to adjust the realized resiliency factor if the number of available storage entities is not sufficient to realize an adjusted resiliency factor that is within a threshold range of the target resiliency factor. In some implementations, the method 300 includes determining not to adjust the realized resiliency factor if a difference between the adjusted resiliency factor and the realized resiliency factor is less than a threshold difference (e.g., less than 2% of the realized resiliency factor).

As represented by block 360, in various implementations, the method 300 includes adjusting the realized resiliency factor to an adjusted resiliency factor upon determining to adjust the realized resiliency factor. As described herein, in some implementations, the method 300 includes adjusting the realized resiliency factor to an adjusted resiliency factor that is equal to the target resiliency factor. In some implementations, the method 300 includes adjusting the realized resiliency factor to an adjusted resiliency factor that is closer to the target resiliency factor. In some implementations, the method 300 includes adjusting the realized resiliency factor to an adjusted resiliency factor that is within a threshold range of the target resiliency factor.

As represented by block 362, in various implementations, the method 300 includes re-distributing object data based on the adjusted resiliency factor. In some implementations, the method 300 includes storing the object data across a number of storage entities that is equal to the adjusted data storage entity count. In various implementations, the adjusted data storage entity count is greater than the realized data storage entity count. In such implementations, the method 300 includes moving some of the object data to storage entities that were not previously storing the object data, so that the object data is spread across a number of storage entities that is equal to the adjusted data storage entity count. In some implementations, the adjusted data storage entity count is less than the realized data storage entity count. In such implementations, the method 300 includes removing the object data from the storage entities that are in excess of the adjusted data storage entity count, and limiting the object data to a number of storage entities that is equal to the adjusted data storage entity count.

As represented by block 364, in various implementations, the method 300 includes synthesizing parity information based on the re-distributed data and the adjusted resiliency factor. In some implementations, the method 300 includes storing the parity information in a number of storage entities that is equal to the adjusted parity storage entity count. A person of ordinary skill in the art will appreciate that, in some implementations, a combination of various methods and systems are utilized to synthesize the parity information. In some implementations, the method 300 includes transmitting an adjustment confirmation to the client device (e.g., the adjustment confirmation 232 shown in FIG. 1B). In some examples, the adjustment confirmation indicates the adjusted resiliency factor. For example, in some scenarios, the adjustment confirmation includes the adjusted data storage entity count and/or the adjusted parity storage entity count.

Figure 4A:
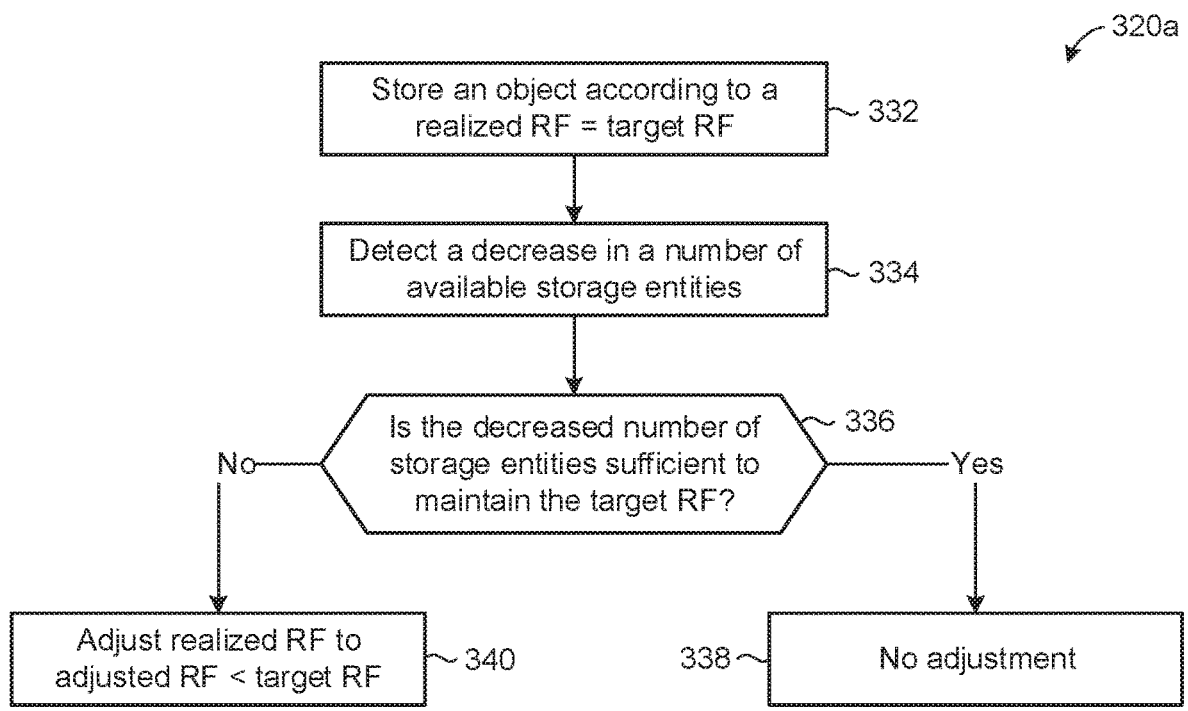
FIG. 4A is a flowchart representation of a method of determining whether or not to adjust a realized resiliency factor of an object upon detecting a decrease in a number of available storage entities in accordance with some implementations.

FIG. 4A is a flowchart representation of a method 320a of determining whether or not to adjust a realized resiliency factor of an object upon detecting a decrease in a number of available storage entities in accordance with some implementations. In various implementations, the method 320a is implemented as a set of computer readable instructions that are executed at a storage system (e.g., the storage system 100 shown in FIGS. 1A-1B). For example, in various implementations, the method 320a is performed by an ingest entity of the storage system (e.g., the ingest entity 120 shown in FIGS. 1A, 1B and 2). Briefly, the method 320a includes detecting a decrease in a number of available storage entities, and determining whether or not to adjust a realized resiliency factor of an object based on the decrease in the number of available storage entities.

As represented by block 332, in various implementations, the method 320a includes storing an object according to a realized resiliency factor that is equal to a target resiliency factor for the object. As represented by block 334, in various implementations, the method 320a includes detecting a decrease in a number of available storage entities. For example, in some implementations, the method 320a includes detecting that one or more storage entities has become unavailable. In some examples, the method 320a includes detecting the decrease in the number of available storage entities when one or more storage entities goes offline (e.g., due to a power outage, or a scheduled maintenance). In some scenarios, the method 320a includes detecting the decrease in the number of available storage entities when one or more storage entities fails (e.g., due to a mechanical failure, or a software failure). In some implementations, the method 320a includes detecting that the number of available storage entities has decreased from a first number that is above a sum of the target data storage entity count and the target parity storage entity count to a second number that is below the sum.

As represented by block 336, in various implementations, the method 320a includes determining whether the decreased number of available storage entities is sufficient to maintain a realized resiliency factor of an object that is equal to the target resiliency factor for the object. For example, in some implementations, the method 320a includes determining whether the decreased number of available storage entities is greater than or equal to a sum of the realized data storage entity count and the realized parity storage entity count. If the decreased number of available storage entities is sufficient to maintain the realized resiliency factor then the method 320a proceeds to block 338, otherwise the method 320a proceeds to block 340. As represented by block 338, if the decreased number of available storage entities are sufficient to maintain the target resiliency factor, then the method 320a includes determining not to adjust the realized resiliency factor. As represented by block 340, if the decreased number of available storage entities are not sufficient to maintain the target resiliency factor, then the method 320a includes determining to adjust the realized resiliency factor to an adjusted realized factor that is different from the target resiliency factor. In some implementations, the method 320a includes determining an adjusted resiliency factor that is as close to the target resiliency factor as possible given the decreased number of available storage entities.

Figure 4B:
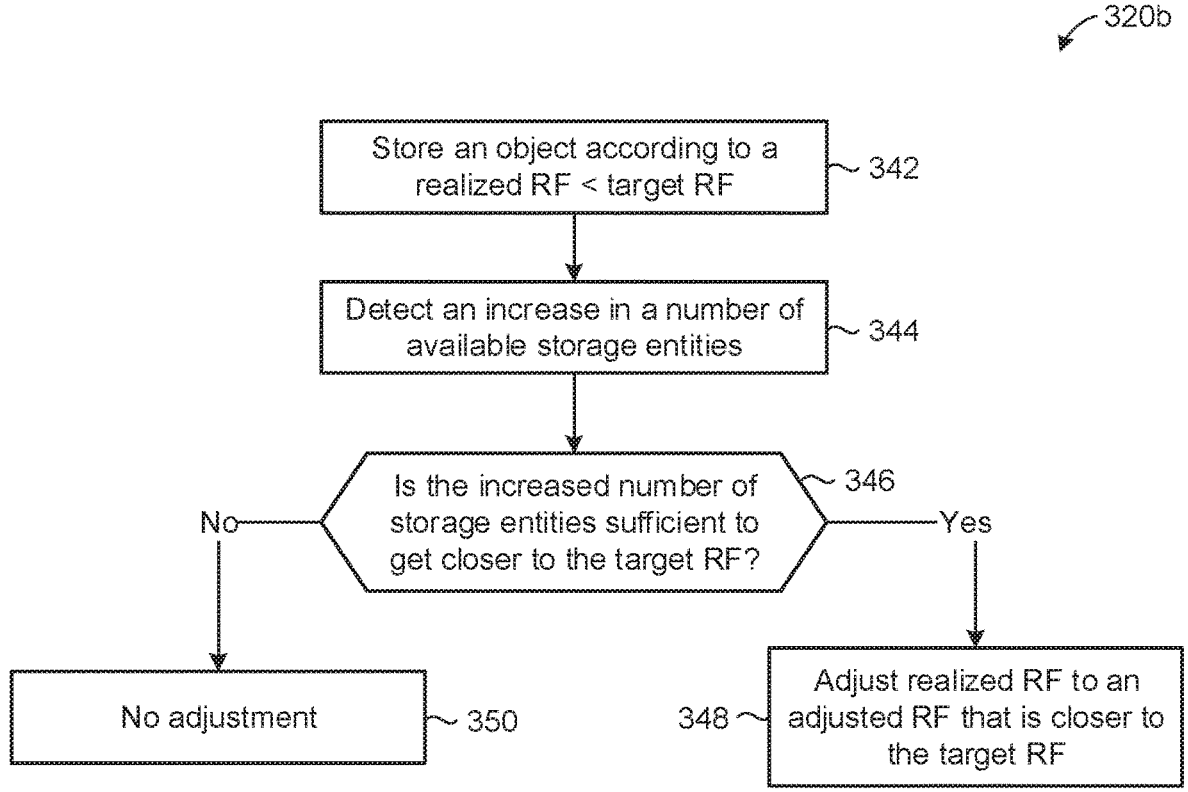
FIG. 4B is a flowchart representation of a method of determining whether or not to adjust a realized resiliency factor of an object upon detecting an increase in a number of available storage entities in accordance with some implementations.

FIG. 4B is a flowchart representation of a method 320b of determining whether or not to adjust a realized resiliency factor of an object upon detecting an increase in a number of available storage entities in accordance with some implementations. In various implementations, the method 320b is implemented as a set of computer readable instructions that are executed at a storage system (e.g., the storage system 100 shown in FIGS. 1A and 1B). For example, in various implementations, the method 320b is performed by an ingest entity of the storage system (e.g., the ingest entity 120 shown in FIGS. 1A, 1B and 2). Briefly, the method 320b includes detecting an increase in a number of available storage entities, and determining whether or not to adjust a realized resiliency factor of an object based on the increase in the number of available storage entities.

As represented by block 342, in various implementations, the method 320b includes storing an object according to a realized resiliency factor that is less than a target resiliency factor for the object. As represented by block 344, in various implementations, the method 320b includes detecting an increase in a number of available storage entities. For example, in some implementations, the method 320b includes detecting that one or more storage entities that was previously unavailable has become available. In some examples, the method 320b includes detecting the increase in the number of available storage entities when one or more storage entities comes online (e.g., after suffering a power outage, or after undergoing a scheduled maintenance). In some scenarios, the method 320b includes detecting the increase in the number of available storage entities when one or more storage entities that had previously failed is restored (e.g., via a mechanical upgrade, or a software patch). In some implementations, the method 320b includes detecting an increase in the number of available storage entities from a first number that is below a sum of the target data storage entity count and the target parity storage entity count to a second number that is above the sum.

As represented by block 346, in various implementations, the method 320b includes determining whether the increased number of available storage entities is sufficient to adjust the realized resiliency factor to an adjusted resiliency factor that is closer to the target resiliency factor. If the increased number of available storage entities is sufficient to attain an adjusted resiliency factor that is closer to the target resiliency factor then the method 320b proceeds to block 348, otherwise the method 320b proceeds to block 350. As represented by block 348, in some implementations, the method 320b includes determining to adjust the realized resiliency factor to an adjusted resiliency factor that is closer to the target resiliency factor than the realized resiliency factor. In some examples, the adjusted resiliency factor is equal to the target resiliency factor. In some examples, the adjusted resiliency factor is within a threshold range of the target resiliency factor. In some implementations, the method 320b includes determining an adjusted resiliency factor that is a function of the increased number of available storage entities and the target resiliency factor. As represented by block 350, if the increased number of storage entities is not sufficient to attain an adjusted resiliency factor that is closer to the target resiliency factor, then the method 320b includes determining not to adjust the realized resiliency factor.

FIG. 5 is a block diagram of a server system 500 enabled with various modules that are provided to adjust a realized resiliency factor of an object based on a target resiliency factor for the object in accordance with some implementations. For example, in various implementations, the server system 500 is enabled with one or more components of an ingest entity of a storage system (e.g., the ingest entity 120 shown in FIGS. 1A, 1B and 2) according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 502, a network interface 503, a memory 510, a programming interface 508, and one or more communication buses 504 for interconnecting these and various other components.

In some implementations, the network interface 503 is provided to, among other uses, establish and maintain a metadata tunnel between a cloud hosted network management system and at least one private network including one or more compliant devices. In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium.

In some implementations, the memory 510 or the non-transitory computer readable storage medium of the memory 510 stores the following programs, modules and data structures, or a subset thereof including an optional operating system 520, a resiliency management module 522, a resiliency determination module 524, a resiliency adjustment module 526, and a data store 528. In various implementations, the resiliency management module 522, the resiliency determination module 524, the resiliency adjustment module 526 and the data store 528 are similar to the resiliency management module 122, the resiliency determination module 124, the resiliency adjustment module 126 and the data store 128, respectively, shown in FIG. 2.

The operating system 520 includes procedures for handling various basic system services and for performing hardware dependent tasks.

In various implementations, the resiliency determination module 524 determines a realized resiliency factor for an object (e.g., the realized resiliency factor 130 shown in FIGS. 1A and 2). To that end, in various implementations, the resiliency determination module 524 includes instructions and/or logic 524a, and heuristics and metadata 524b. In various implementations, the resiliency management module 522 determines whether or not to adjust the realized resiliency factor of an object to an adjusted resiliency factor (e.g., the adjusted resiliency factor 230 shown in FIGS. 1B and 2) based on a target resiliency factor (e.g., the target resiliency factor 30 shown in FIGS. 1A and 2). In various implementations, the resiliency management module 522 manages a resiliency factor of an object. To that end, in various implementations, the resiliency management module 522 includes instructions and/or logic 522a, and heuristics and metadata 522b. In various implementations, the resiliency adjustment module 526 adjusts the realized resiliency module to the adjusted resiliency factor. In some implementations, the adjusted resiliency factor is equal to the target resiliency factor. In some implementations, the adjusted resiliency factor is closer to the target resiliency factor than the realized resiliency factor. In various implementations, the adjusted resiliency factor is a function of the target resiliency factor and a number of available storage entities in the storage system. To that end, in various implementations, the resiliency adjustment module 526 includes instructions and/or logic 526a, and heuristics and metadata 526b. In various implementations, the server system 500 performs the method 300 shown in FIG. 3, the method 320a shown in FIG. 4A, and/or the method 320b shown in FIG. 4B.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an enterprise object storage system including a plurality of storage entities, each configured to store data on a block basis, and one or more processors:
obtaining a target resiliency factor and a realized resiliency factor for an object, wherein the target resiliency factor indicates a target number of data storage entities and a target number of parity storage entities for the object, and the realized resiliency factor indicates a realized number of data storage entities and a realized number of parity storage entities allocated to the object;
determining whether or not to adjust the realized resiliency factor for the object based on the target resiliency factor and a number of available storage entities in the enterprise object storage system;
adjusting the realized resiliency factor to an adjusted resiliency factor in response to determining to adjust the realized resiliency factor, wherein the adjusted resiliency factor indicates an adjusted number of data storage entities and an adjusted number of parity storage entities for the object; and
re-distributing, according to the adjusted realized resiliency, object data associated with the object across the adjusted number of data storage entities and parity information associated with the object across the adjusted number of parity storage entities.

2. The method of claim 1, wherein:
the object includes a file that refers to a data asset presentable to a user;
the object data associated with the object re-distributed across the adjusted number of data storage entities is stored across data blocks; and
the parity information associated with the object re-distributed across the adjusted number of parity storage entities is stored across parity blocks.

3. The method of claim 1, wherein re-distributing, according to the adjusted realized resiliency, the object data associated with the object across the adjusted number of data storage entities and the parity information associated with the object across the adjusted number of parity storage entities includes:
storing the object data across the adjusted number of data storage entities as re-distributed object data;
synthesizing the parity information associated with the object based on the re-distributed object data and the adjusted resiliency factor; and
storing the parity information across the adjusted number of parity storage entities.

4. The method of claim 1, wherein re-distributing, according to the adjusted realized resiliency, the object data associated with the object across the adjusted number of data storage entities and the parity information associated with the object across the adjusted number of parity storage entities includes:
determining that the adjusted number of data storage entity is greater than the realized number of data storage entities;

moving a portion of the object data associated with the object to storage entities that were not previously storing the object data; and spreading the object data across the adjusted number of data storage entities.

5. The method of claim 1, wherein re-distributing, according to the adjusted realized resiliency, the object data associated with the object across the adjusted number of data storage entities and the parity information associated with the object across the adjusted number of parity storage entities includes:

determining that the adjusted number of data storage entity is less than the realized number of data storage entities;

removing a portion of the object data from storage entities that are in excess of the adjusted number of data storage entities; and limiting the object data to the adjusted number of data storage entities.

6. The method of claim 1, further comprising:

counting the realized number of data storage entities that store data segments of the object data;

counting the realized number of parity storage entities that store parity segments of the object data;

calculating the realized resiliency factor based on the realized number of data storage entities and the realized number of parity storage entities; and storing the realized resiliency factor in a non-transitory memory.

7. The method of claim 6, wherein obtaining the realized resiliency factor for the object comprises:

obtaining the realized resiliency factor for the object from the non-transitory memory.

8. An enterprise object storage system comprising:

a plurality of storage entities that are configured to store objects in a distributed manner; and an ingest entity including one or more processors configured to execute computer readable instructions included on a non-transitory memory and a non-transitory memory including computer readable instructions that, when executed by the one or more processors, cause the ingest entity to:

obtain a target resiliency factor and a realized resiliency factor for an object, wherein the target resiliency factor indicates a target number of data storage entities and a target number of parity storage entities for the object, and the realized resiliency factor indicates a realized number of data storage entities and a realized number of parity storage entities allocated to the object;

determine whether or not to adjust the realized resiliency factor for the object based on the target resiliency factor and a number of available storage entities in the enterprise object storage system;

adjust the realized resiliency factor to an adjusted resiliency factor in response to determining to adjust the realized resiliency factor, wherein the adjusted resiliency factor indicates an adjusted number of data storage entities and an adjusted number of parity storage entities for the object; and re-distribute, according to the adjusted realized resiliency, object data associated with the object across the adjusted number of data storage entities and parity information associated with the object across the adjusted number of parity storage entities.

9. The enterprise object storage system of claim 8, wherein:

the object includes a file that refers to a data asset presentable to a user;

the object data associated with the object re-distributed across the adjusted number of data storage entities is stored across data blocks; and the parity information associated with the object re-distributed across the adjusted number of parity storage entities is stored across parity blocks.

10. The enterprise object storage system of claim 8, wherein re-distributing, according to the adjusted realized resiliency, the object data associated with the object across the adjusted number of data storage entities and the parity information associated with the object across the adjusted number of parity storage entities includes:

storing the object data across the adjusted number of data storage entities as re-distributed object data;

synthesizing the parity information associated with the object based on the re-distributed object data and the adjusted resiliency factor; and storing the parity information across the adjusted number of parity storage entities.

11. The enterprise object storage system of claim 8, wherein re-distributing, according to the adjusted realized resiliency, the object data associated with the object across the adjusted number of data storage entities and the parity information associated with the object across the adjusted number of parity storage entities includes:

determining that the adjusted number of data storage entity is greater than the realized number of data storage entities;

moving a portion of the object data associated with the object to storage entities that were not previously storing the object data; and spreading the object data across the adjusted number of data storage entities.

12. The enterprise object storage system of claim 8, wherein re-distributing, according to the adjusted realized resiliency, the object data associated with the object across the adjusted number of data storage entities and the parity information associated with the object across the adjusted number of parity storage entities includes:

determining that the adjusted number of data storage entity is less than the realized number of data storage entities;

removing a portion of the object data from storage entities that are in excess of the adjusted number of data storage entities; and limiting the object data to the adjusted number of data storage entities.

13. The enterprise object storage system of claim 8, wherein the ingest entity is further configured to:

count the realized number of data storage entities that store data segments of the object data;

count the realized number of parity storage entities that store parity segments of the object data;

calculate the realized resiliency factor based on the realized number of data storage entities and the realized number of parity storage entities; and store the realized resiliency factor in the non-transitory memory.

14. The enterprise object storage system of claim 13, wherein obtaining the realized resiliency factor for the object comprises:

obtaining the realized resiliency factor for the object from the non-transitory memory.

15. A device comprising:
a processor configured to execute computer readable instructions included on a non-transitory memory; and
the non-transitory memory including computer readable instructions, that when executed by the processor, cause the device to:
   obtain a target resiliency factor and a realized resiliency factor for an object, wherein the target resiliency factor indicates a target number of data storage entities and a target number of parity storage entities for the object, and the realized resiliency factor indicates a realized number of data storage entities and a realized number of parity storage entities allocated to the object;
   determine whether or not to adjust the realized resiliency factor for the object based on the target resiliency factor and a number of available storage entities in the enterprise object storage system;
   adjust the realized resiliency factor to an adjusted resiliency factor in response to determining to adjust the realized resiliency factor, wherein the adjusted resiliency factor indicates an adjusted number of data storage entities and an adjusted number of parity storage entities for the object; and
   re-distribute, according to the adjusted realized resiliency, object data associated with the object across the adjusted number of data storage entities and parity information associated with the object across the adjusted number of parity storage entities.

16. The device of claim 15, wherein:
the object includes a file that refers to a data asset presentable to a user;
the object data associated with the object re-distributed across the adjusted number of data storage entities is stored across data blocks; and
the parity information associated with the object re-distributed across the adjusted number of parity storage entities is stored across parity blocks.

17. The device of claim 15, wherein re-distributing, according to the adjusted realized resiliency, the object data associated with the object across the adjusted number of data storage entities and the parity information associated with the object across the adjusted number of parity storage entities includes:
   storing the object data across the adjusted number of data storage entities as re-distributed object data;
   synthesizing the parity information associated with the object based on the re-distributed object data and the adjusted resiliency factor; and
   storing the parity information across the adjusted number of parity storage entities.

18. The device of claim 15, wherein re-distributing, according to the adjusted realized resiliency, the object data associated with the object across the adjusted number of data storage entities and the parity information associated with the object across the adjusted number of parity storage entities includes:
   determining that the adjusted number of data storage entity is greater than the realized number of data storage entities;
   moving a portion of the object data associated with the object to storage entities that were not previously storing the object data; and
   spreading the object data across the adjusted number of data storage entities.

19. The device of claim 15, wherein re-distributing, according to the adjusted realized resiliency, the object data associated with the object across the adjusted number of data storage entities and the parity information associated with the object across the adjusted number of parity storage entities includes:
   determining that the adjusted number of data storage entity is less than the realized number of data storage entities;
   removing a portion of the object data from storage entities that are in excess of the adjusted number of data storage entities; and
   limiting the object data to the adjusted number of data storage entities.

20. The device of claim 15, wherein the non-transitory memory further includes the computer readable instructions, that when executed by the processor, cause the device to:
   count the realized number of data storage entities that store data segments of the object data;
   count the realized number of parity storage entities that store parity segments of the object data;
   calculate the realized resiliency factor based on the realized number of data storage entities and the realized number of parity storage entities; and
   store the realized resiliency factor in the non-transitory memory.

* * * * *